United States Patent [19]

Earleson et al.

[11] Patent Number: 5,036,669

[45] Date of Patent: Aug. 6, 1991

[54] APPARATUS AND METHOD FOR CONTROLLING THE AIR/FUEL RATIO OF AN INTERNAL COMBUSTION ENGINE

[75] Inventors: Walter E. Earleson; Siamak Mirhakimi, both of Peoria, Ill.

[73] Assignee: Caterpillar Inc., Peoria, Ill.

[21] Appl. No.: 456,392

[22] Filed: Dec. 26, 1989

[51] Int. Cl.[5] .............................................. F02D 23/00
[52] U.S. Cl. .................................... 60/602; 123/435; 123/239
[58] Field of Search .................... 60/602; 123/435, 293

[56] References Cited

U.S. PATENT DOCUMENTS

| | | | |
|---|---|---|---|
| 4,308,519 | 12/1981 | Garcea et al. | 340/53 |
| 4,357,918 | 11/1982 | Asano | 123/435 |
| 4,463,729 | 8/1984 | Bullis et al. | 123/435 |
| 4,465,046 | 8/1984 | May | 123/435 |
| 4,488,528 | 12/1984 | Morikawa | 123/425 |
| 4,524,745 | 6/1985 | Tominari et al. | 123/478 |
| 4,535,740 | 8/1985 | Ma | 123/435 |
| 4,557,236 | 12/1985 | Showalter | 123/435 |
| 4,646,522 | 3/1987 | Mamiya et al. | 60/602 |
| 4,665,737 | 5/1987 | Britsch et al. | 73/35 |
| 4,724,812 | 2/1988 | Akagi | 123/435 |
| 4,887,575 | 12/1989 | Takahashi | 123/435 |
| 4,962,739 | 10/1990 | Wataya | 123/435 |

FOREIGN PATENT DOCUMENTS

| | | |
|---|---|---|
| 0129971 | 2/1989 | European Pat. Off. |
| 2284767 | 4/1976 | France . |
| 1512213 | 5/1978 | United Kingdom . |
| 2060061A | 4/1981 | United Kingdom . |
| 2060062B | 4/1983 | United Kingdom . |

OTHER PUBLICATIONS

SAE paper 860485 entitled "In-Cylinder Measurement of Combustion Characteristics Using Ionization Sensors", 6/1990.

Primary Examiner—Leonard E. Smith
Assistant Examiner—Michael I. Kocharov
Attorney, Agent, or Firm—Joseph W. Keen; Kirk A. Vander Leest

[57] ABSTRACT

In the subject invention an electronic control unit is used to control the air/fuel ratio in an engine combustion chamber in response to sensed engine parameters. More particularly, a magneto interface produces an ignition signal which is delivered to a spark plug. The spark plug is disposed essentially in the center of a combustion chamber, and it ignites an air/fuel mixture in the chamber in response to the ignition signal. A sensor such as an ion probe, for example, is further disposed in the combustion chamber longitudinally from the spark plug. The sensor produces an ionization signal in response to a flame front propagating past the sensor. A buffer circuit receives the ignition and ionization signals and produces a combustion signal in response to a time difference between the reception of these signals. The electronic control unit receives the combustion signal and calculates a combustion signal air/fuel ratio in response to the combustion signal. Both the combustion signal and the combustion signal air/fuel ratio are responsive to changes in the quality of the fuel in the combustion chamber. Subsequently, the control unit calculates a volumetric air/fuel ratio. The volumetric air/fuel ratio is indicative of the volume of air and fuel in the combustion chamber, and it does not account for fluctuations in fuel quality. Finally, a wastegate is controlled in response to the volumetric and combustion signal air/fuel ratios.

23 Claims, 5 Drawing Sheets

Fig_3_

APPARATUS AND METHOD FOR CONTROLLING THE AIR/FUEL RATIO OF AN INTERNAL COMBUSTION ENGINE

DESCRIPTION

1. Technical Field

The present invention relates generally to a system for controlling the air/fuel ratio of an internal combustion engine, and, more particularly, to a system for controlling the air/fuel ratio of a spark ignited engine in response to changes in the quality of a fuel supply.

2. Background

Spark ignited engines, as referred to hereinafter, differ from other internal combustion engines in that their fuel is desirably ignited by use of a spark or other energy source rather than igniting their fuel with the heat of compression. The quality of the fuel supplied to such engines often varies greatly. For example, such an engine may be used in a pumping application on a gas pipeline or as the driver for an electrical generator. The fuel used to power such engines is typically natural gas supplied from a pipeline, on-site wells, or can be, for example, in the form of methane produced by a sanitary landfill. The quality of fuel from such a source can vary greatly over time, thereby affecting engine operation and potentially degrading engine integrity.

More particularly, the quality of natural gas is often measured in two ways: (1) methane number; and (2) lower heating valve (LHV). The methane number which is analogous to the octane number used to rate gasoline and signifies how easily the fuel ignites wherein fuel having a low methane number ignites relatively easier than fuel having a higher methane number. The LHV is a measure of the energy contained in a mass unit of fuel. A variation in either the methane number or the LHV of the fuel can, without adjusting appropriate engine operating parameters, adversely affect engine's performance by altering the time when the peak pressure occurs in the engine's cylinders.

An engine produces maximum power when the peak pressure in the engine cylinders occurs shortly after the piston reaches top-dead-center (TDC) during the combustion stroke. More specifically, during the compression stroke, the cylinder pressure increases at a first rate as illustrated by segment A of FIG. 1. Subsequently, when the spark plug fires at point B, the cylinder pressure begins to rise more rapidly as the air/fuel mixture in the cylinder burns, as illustrated by segment C. Peak cylinder pressure occurs at point D which is shortly after the piston reaches top-dead-center.

Figure 1:
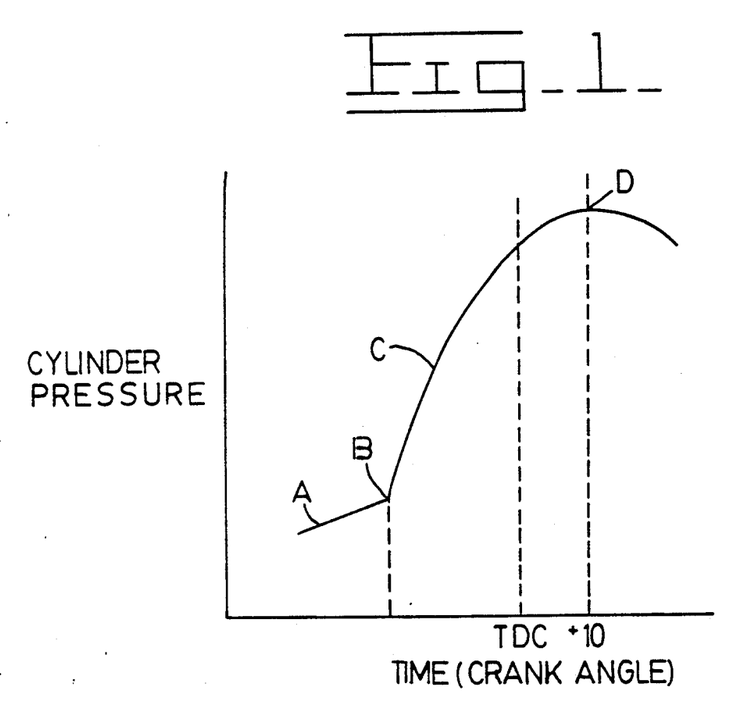
FIG. 1 is a graph of cylinder pressure versus crank angle or time for a specific air/fuel ratio.

If the LHV or methane number of the engine's fuel changes, the slope of segment C will change. More particularly, if the LHV increases or the methane number decreases, the slope of C increases, corresponding to a faster burn rate. Conversely, if the LHV decreases or the methane number increases, the slope of C decreases, corresponding to a slower burn rate. Accordingly, a change in the burn rate will shift the peak cylinder pressure either to the left or right of point D.

To date, the most common method of correcting for a shift in the occurrence of the peak pressure has been to adjust the timing. More specifically, if the slope of A increases causing the peak pressure to shift left, the timing is retarded, causing the spark plug to fire later in the combustion stroke. However, this causes the engine operating temperature and fuel consumption to increase and the engine reliability to decrease.

Conversely, if the slope of C decreases, the peak pressure will occur at some point to the right of D. To correct this problem, it is common to fire the spark plug earlier in the combustion stroke (advance the timing). However, advancing the timing increases the likelihood of a spontaneous combustion of the air/fuel mixture in the combustion chamber or detonation. Detonation is a function of the air/fuel ratio, the temperature and pressure. When the timing is advanced, air/fuel detonation is more likely to occur in the combustion chamber, thereby causing structural damage to the cylinder wall, piston, cylinder head, or other combustion chamber boundaries at the locale of such detonation.

An alternate way to compensate for changes in the LHV or methane number of the fuel is to change the slope of segment C. This can be accomplished by either changing the methane number of the fuel or by changing the air/fuel ratio in the combustion chamber. Since the methane number of the fuel supply can't be readily controlled, a preferable control scheme is to adjust the air/fuel ratio. Furthermore, the air/fuel ratio can be adjusted by controlling air flow, fuel flow, or both.

Past air/fuel ratio controllers have typically used oxygen sensors, for example, located in the intake or exhaust manifolds; however, these sensors are relatively expensive. An economical alternative has been the use of inexpensive ion probes or other sensors located in the combustion chamber. An example of such a system is found in U.S. Pat. No. 4,535,740 which issued on Aug. 20, 1985 to Ma. Ma uses an ion sensor in a slow, closed loop to adjust for long term drift in an open loop. More particularly, an open loop is used to control the air/fuel ratio in response to sensed operating parameters in accordance with a stored fueling map. The slower, closed loop is used to correct for long term drift in the fueling map caused by changes in ambient conditions such as atmospheric pressure. However, because of the nature of the control scheme in Ma, the closed loop correction factor is not reliable under all conditions. Furthermore, to compensate for the above-mentioned changes in fuel quality, Ma must rely on several different fueling maps. Ma compares the open and closed loop signals at certain points to determine if the correct fueling data map is being utilized. If there is a discrepancy between the compared points, a different fueling map is selected. Because the quality of fuel can vary over a wide range, a large number of fueling maps are necessary if the Ma system is to work with acceptable precision. These maps are costly to develop and take up valuable memory in the engine controller.

The present invention addresses the above mentioned problems with a controller that adjusts for variations in fuel quality by controlling air flow in response to the burn characteristic of the air/fuel mixture in the combustion chamber. The fuel flow to the engine is controlled by a separate controller and is typically adjusted only for power governing. Other aspects, objects and advantages can be obtained from a study of the drawings, the disclosure, and the appended claims.

DISCLOSURE OF THE INVENTION

In accordance with one aspect of the present invention there is provided an apparatus for controlling the air/fuel mixture delivered to a combustion chamber of an internal combustion engine. A ignition means receives an ignition signal and ignites the air/fuel mixture in response to the ignition signal. A sensor means produces an ionization signal in response to a flame reaching the sensor. A timer means receives the ignition and ionization signals and produces a combustion signal in response to a time difference between the reception of the signals. An air flow sensor means senses the amount of air delivered to the combustion chamber and generates an air flow signal. A fuel flow sensor means senses the amount of fuel delivered to the combustion chamber and generates a fuel flow signal. A controller means receives the combustion, air flow, and fuel flow signals, calculates a combustion signal air/fuel ratio in response to the combustion signal, calculates a volumetric air/fuel ratio in response to the air flow and fuel flow signals, and produces a control signal in response to a ratio of the volumetric and combustion signal air/fuel ratios. An actuator means for receiving the control signal controls the amount of air delivered to the combustion chamber in response to the control signal.

In accordance with another aspect of the present invention, there is provided an apparatus for controlling the ratio of an air/fuel mixture delivered to a combustion chamber of an internal combustion engine. An ignition means receives an ignition signal and ignites the air/fuel mixture in response to the ignition signal. A sensor means produces an ionization signal in response to a flame reaching the sensor. A timer means receives the ignition and ionization signals and produces a combustion signal in response to a time difference between the reception of the signals. An air pressure sensor produces an actual air pressure signal in response to the pressure of the air delivered to the combustion chamber. An air flow calculator means receives the air pressure signal and produces an air flow signal in response to the air pressure signal. A fuel flow sensor means produces a fuel flow signal in response to the amount of fuel delivered to the combustion chamber. A controller means receives the combustion, air flow, actual air pressure, and fuel flow signals, calculates a combustion signal air/fuel ratio in response to the combustion signal, calculates a volumetric air/fuel ratio in response to the air and fuel flow signals, calculates a correction factor in response to the ratio of the volumetric and combustion signal air/fuel ratios, calculates a compensated fuel flow responsive to the correction factor, calculates a desired air pressure signal responsive to the compensated fuel flow, and produces a control signal in response to a difference between the desired air pressure and actual air pressure signals. An actuator means receives the control signal from the controller and adjusts the amount of air delivered to the combustion chamber in response to the control signal.

BEST MODE FOR CARRYING OUT THE INVENTION

Figure 2:
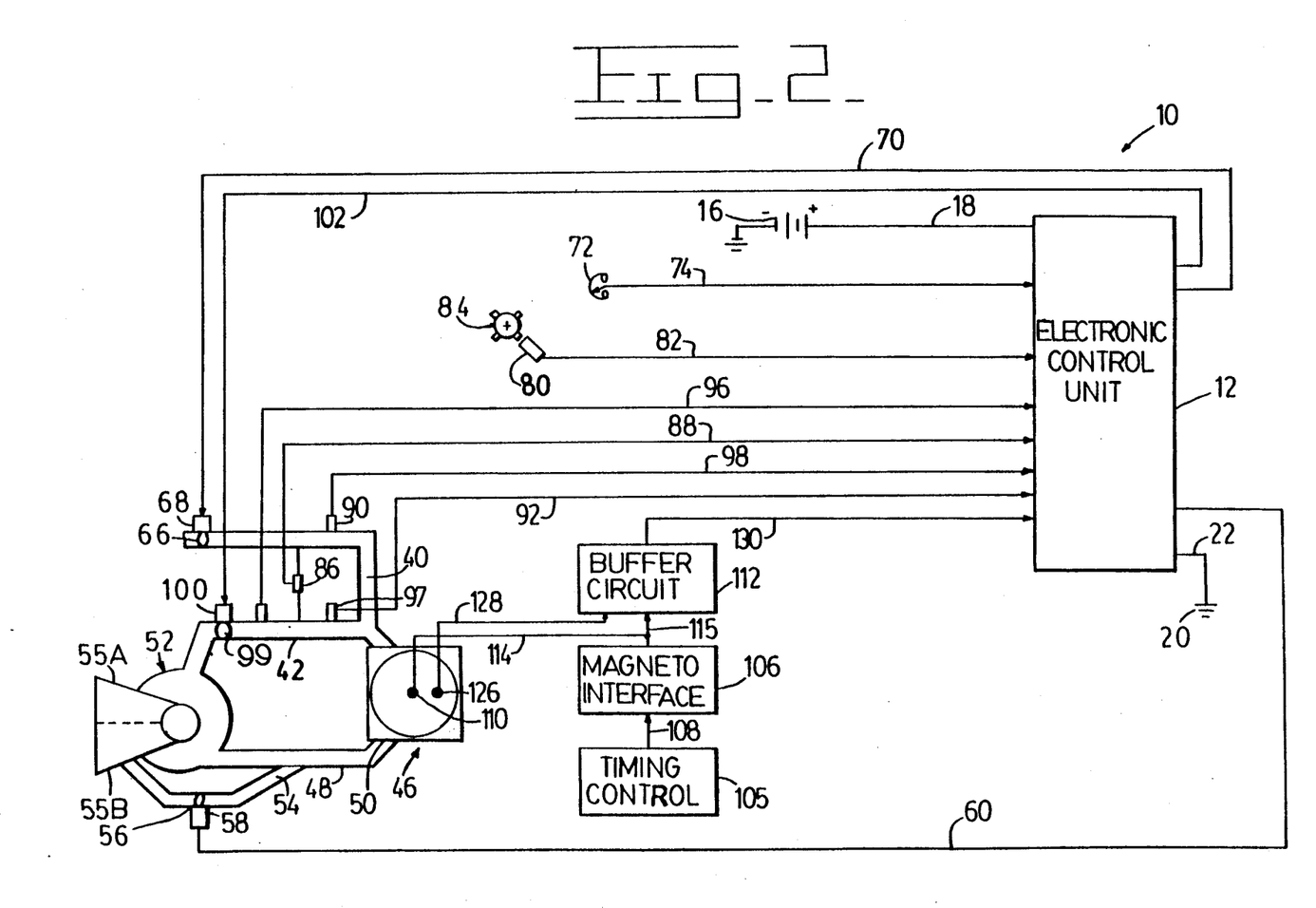
FIG. 2 is a diagrammatic illustration of one embodiment of hardware for incorporating the immediate air/fuel ratio controller.

Referring now to FIG. 2, a diagrammatic illustration of one embodiment of hardware for incorporating the immediate air/fuel ratio control system 10 in a spark ignited engine (not shown) is discussed. In the preferred embodiment, the control system 10 includes an electronic control unit 12 which includes 2 68HCIIAI microprocessors (not shown) having external ROM and RAM. The microprocessors are manufactured by Motorola Inc. of Phoenix, Ariz. As would be apparent to one skilled in the art, the electronic control unit 12 could be embodied in any one of a variety of microprocessor based systems. The control unit 12 is connected to a source of electrical potential 16, such as a battery, by an electrical conductor 18. The control unit 12 is further connected to a source of low potential 20, such as battery ground, by an electrical conductor 22. The control unit 12 receives sensory inputs from a variety of engine sensors and produces control signals which are used to control several engine parameters in response to the sensed inputs.

A fuel line 40 is connected to an intake manifold 42 which is in turn connected to an intake port 44 of an engine combustion chamber 46. For illustration purposes only one combustion chamber 46 is shown; however, as will be apparent to those skilled in the art, the engine may have a plurality of such combustion chambers. An engine exhaust manifold 48 is connected to an exhaust port 50 of the combustion chamber 46. The intake and exhaust manifolds 42, 48 are further connected to a turbocharger 52 having an exhaust bypass 54. The exhaust bypass 54 serves to route part of the engine exhaust around the turbocharger 52, thereby controlling the air pressure in the intake manifold 42 and, subsequently, the air mass in the combustion chamber 46. Inlet air enters the turbocharger 52 through an inlet port 55A while exhaust from the turbocharger 52 and the bypass 54 exits an exhaust port 55B. Inasmuch as turbochargers of this type are common in the art, no further description shall be provided.

A wastegate 56 is disposed in the exhaust bypass 54 for controlling the amount of engine exhaust routed around/through the turbocharger 52. A first actuator 58 is mechanically connected to the wastegate 56 and electrically connected by an electrical conductor 60 to the electronic control unit 12. The electronic control unit 12 produces a wastegate control signal of the pulse-width-modulated (PWM) type on the conductor 60 and the first actuator 58 controls the position of the wastegate 56 in response to the wastegate control signal. In the preferred embodiment the first actuator 58 is an all-electric actuator produced by Franz Heinzmann GMBH and Company of The Federal Republic of Germany; however, it will be understood that other actuators could be used to perform this function.

A gas metering valve 66 is disposed in the gas line 40 for controlling the amount of gas delivered to the combustion chamber 46. A second actuator 68 is mechanically connected to the valve 66 and electrically connected to the electronic control unit 12 by an electrical conductor 70. The control unit contains a separate software strategy for engine governing which forms no part of the immediate invention and, therefore, will only be described briefly herein. Essentially, the governing control is a closed loop control which regulates fuel flow to maintain a desired engine speed as is common in the art. The governing control portion of the electronic control unit 12 produces a governing control signal of the PWM type on the conductor 70 and the second actuator 68 controls the position of the valve 66 in response to the governing control signal. In the preferred embodiment the first actuator 58 is an all-electric actuator produced by Franz Heinzmann GMBH and Company of The Federal Republic of Germany.

A fuel quality dial 72 is electrically connected to the electronic control unit 12 by an electrical conductor 74. The fuel quality dial 72 is used to input the LHV of the fuel supply. However, if the approximate range of the fuel's LHV is known, the dial 72 is not necessary. Instead, the control unit 12 could be programmed to treat this LHV as a constant, such as the average value over the fuel's range, for example. This concept will be explained in greater detail below. In the preferred embodiment, the fuel quality dial 72 is in the form of a potentiometer (not shown) connected to a processing circuit (not shown). The potentiometer produces a voltage signal responsive to the dial's 72 setting and the processing circuit converts this voltage signal to a pulse-width-modulated PWM signal having a duty cycle responsive to the voltage signal. The PWM signal is delivered to the control unit 12 over the conductor 74.

An engine speed sensor 80 is electrically connected to the electronic control unit 12 by an electrical conductor 82. The speed sensor 80 can be any type of sensor that accurately produces an electrical signal in response to engine crankshaft speed. However, in the preferred embodiment, the speed sensor 80 is mounted on an engine flywheel housing (not shown) and produces a digital speed signal on the conductor 82 in response to the speed of a flywheel 84 mounted on the engine crankshaft (not shown).

An fuel pressure sensor 86 is disposed between the fuel line 40 and the air intake manifold 42. The pressure sensor 86 is electrically connected to the control unit 12 by an electrical conductor 88. The fuel pressure sensor 86 produces a signal on the conductor in response to a pressure differential between the fuel line 40 and the intake manifold 42.

A fuel temperature sensor 90 is disposed in the fuel line 40 and is electrically connected to the control unit 12 by an electrical conductor 92. The fuel temperature sensor 90 produces a signal on the conductor 92 in response to the temperature of the fuel being delivered to the combustion chamber 46.

An air pressure sensor 94 is disposed in the intake manifold 42 and is electrically connected to the control unit 12 by an electrical conductor 96. The air pressure sensor produces a signal on the conductor in response to the actual absolute air pressure in the air intake manifold 42.

An air temperature sensor 97 is disposed in the air intake manifold 42 and electrically connected to the control unit 12 by an electrical conductor 98. The air temperature sensor 97 produces a signal on the conductor 98 in response to the temperature of the air intake manifold.

A choke valve 99 is disposed in the intake manifold 42 and is provided to restrict the volume of air delivered to the combustion chamber(s) 46 under light engine loads. A choke actuator unit 100 is mechanically connected to the choke valve 99 and electrically connected by an electrical conductor 102 to the control unit 12. The control unit 12 produces a choke control signal of the PWM type on the conductor 102 to control the position of the choke valve 99. In the preferred embodiment the actuator unit 100 is an all-electric actuator manufactured by Franz Heinzmann GMBH and Company of the Federal Republic of Germany.

A timing control 105 is provided for controlling engine timing in response to a variety of sensed engine parameters. The timing control 105 forms no part of the present invention; therefore, it will not be explained in detail herein.

The timing control 105 is connected to a magneto interface 106 by an electrical conductor 108. The timing control produces a timing signal on the conductor 108 for controlling engine timing. The magneto interface 106 is electrically connected to an ignition means 109 which includes a spark plug 110 by an electrical conductor 114. The magneto interface 106 is further electrically connected to a buffer circuit 112 by an electrical conductor 115. The magneto interface 106 delivers an ignition signal to the spark plug and the buffer circuit over the electrical conductors 115, 115, respectively, in response to the timing signal.

Figure 3:
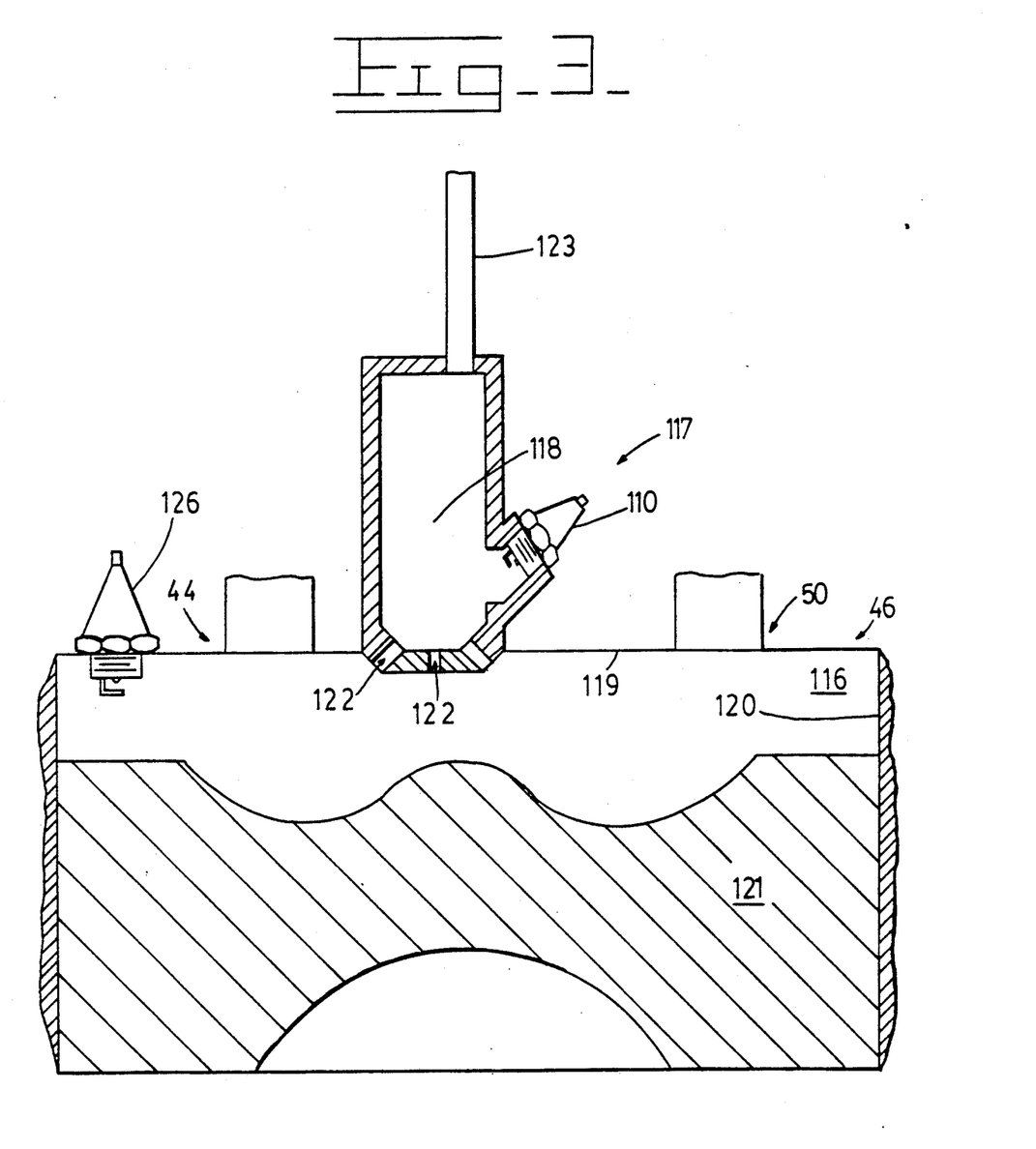
FIG. 3 is a cross-sectional illustration of a prechamber engine of a preferred embodiment of the immediate air/fuel ratio controller.

In the preferred embodiment, the engine includes is a prechamber engine as is common in the art. Referring now to FIG. 3, an illustrative cross-sectional view of a prechamber engine of a preferred embodiment of the immediate air/fuel ratio controller 10 is discussed. In a prechamber engine, the combustion chamber 46 includes a main chamber 116 and the ignition means 109 includes a prechamber 118 and the spark plug 110. The main chamber 116 is defined by a space between the top 119 and side walls 120 of the combustion chamber 46 and a piston 121. A plurality of orifices 122 between the prechamber 118 and the main chamber 116 permit flow therebetween. The spark plug 110 is disposed in the prechamber 118 for igniting the air/fuel mixture therein. An air/fuel mixture is delivered to the main chamber 116 through the intake manifold 44 and pure fuel is delivered to the prechamber 116 through a fuel line 123. When the piston 121 rises in the combustion chamber 46 during the combustion stroke, the air/fuel mixture in the main chamber 116 is forced through the orifices 122, thereby leaning out the mixture in the prechamber 118. Subsequently, when the spark plug 110 fires in response to the ignition signal, a plurality of high-intensity flames are delivered to the main chamber 116 through the orifices 122, thereby igniting the air/fuel mixture in the main chamber 116.

In the preferred embodiment, the prechamber 116 is centrally connected to the main combustion chamber top 119, as shown, and a sensor 126 is disposed in the combustion chamber 46 at a predetermined longitudinal distance from the prechamber 116. It is understood that the prechamber 116 could be replaced by a conventional sparkplug disposed in the mainchamber 118. Inasmuch as prechamber engines of this type are common in the art, no greater detail shall be provided herein.

Returning now to FIG. 2, the sensor 126 is electrically connected to the buffer circuit 112 by an electrical conductor 128. The buffer circuit 112 is further connected to the control unit 12 by an electrical conductor 130. The sensor 126 produces an ionization signal on the conductor 128 in response to a flame front in the combustion chamber 46 propagating past the sensor 126. In the preferred embodiment, the sensor 126 is an ion probe; however, it is foreseeable to use an optical sensor, for example, to perform this function. The operation of an ion probe is well known in the art; therefore, it will not be discussed in greater detail herein.

The buffer circuit 112 receives the ignition and ionization signals via the respective conductors 115, 128. The buffer circuit 112 in turn produces a combustion signal on the conductor 130 in response to a time difference between the reception of the ignition and ionization signals. As will be understood by those skilled in the art, the combustion signal is indicative of the burn rate of the air/fuel mixture in the combustion chamber 118 and further of the effective air/fuel ratio of the mixture. The combustion signal is used by the control unit 12 to control the air/fuel ratio in the combustion chamber 46 as discussed below. In the preferred embodiment, the combustion signal is a pulsed signal wherein the duration of the pulse is responsive to the measured time difference between the ignition and ionization signals.

Figure 4A:
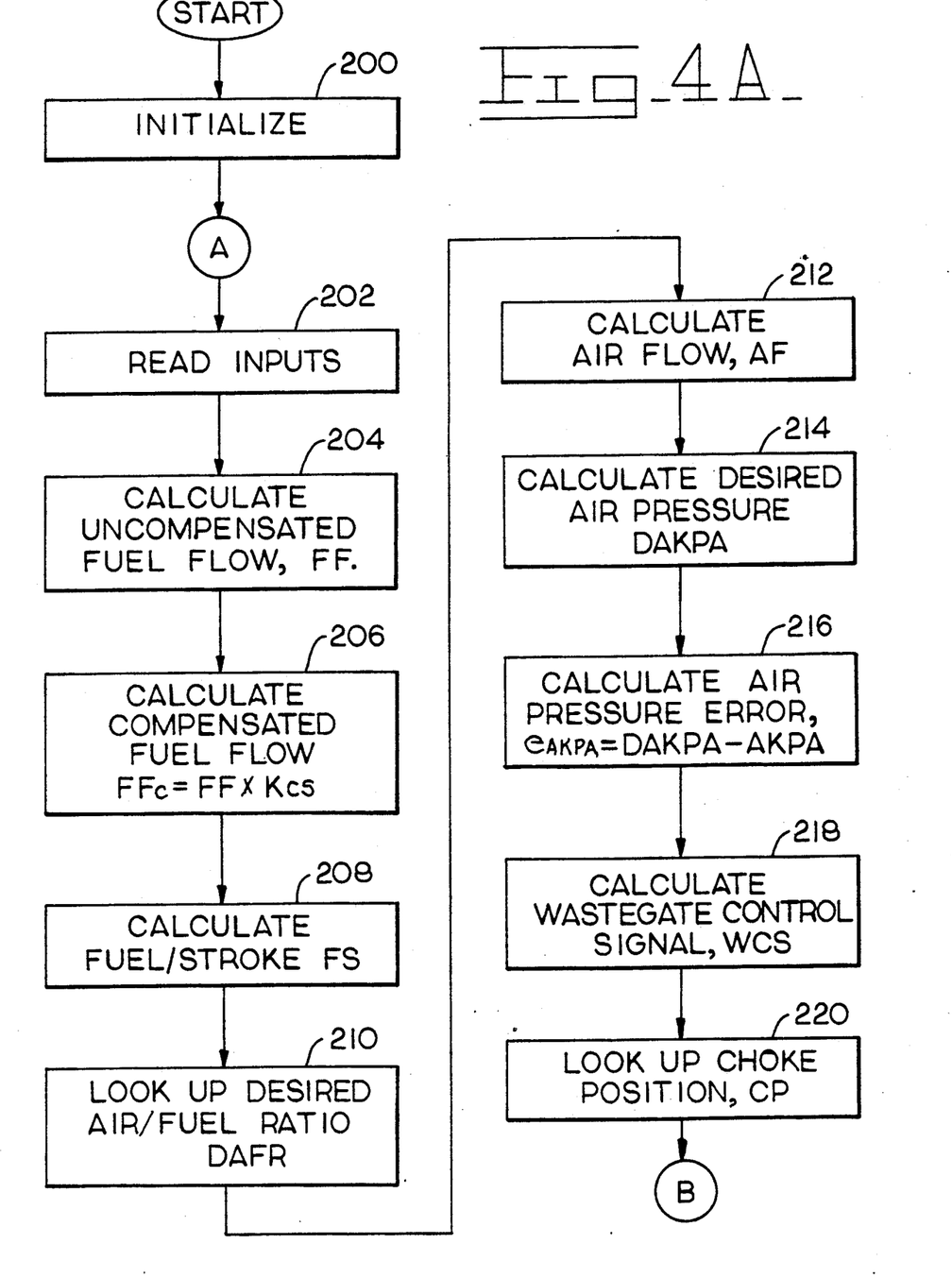
FIGS. 4A-4B are flowcharts of certain functions performed by an embodiment of the immediate air/fuel ratio controller.
Figure 4B:
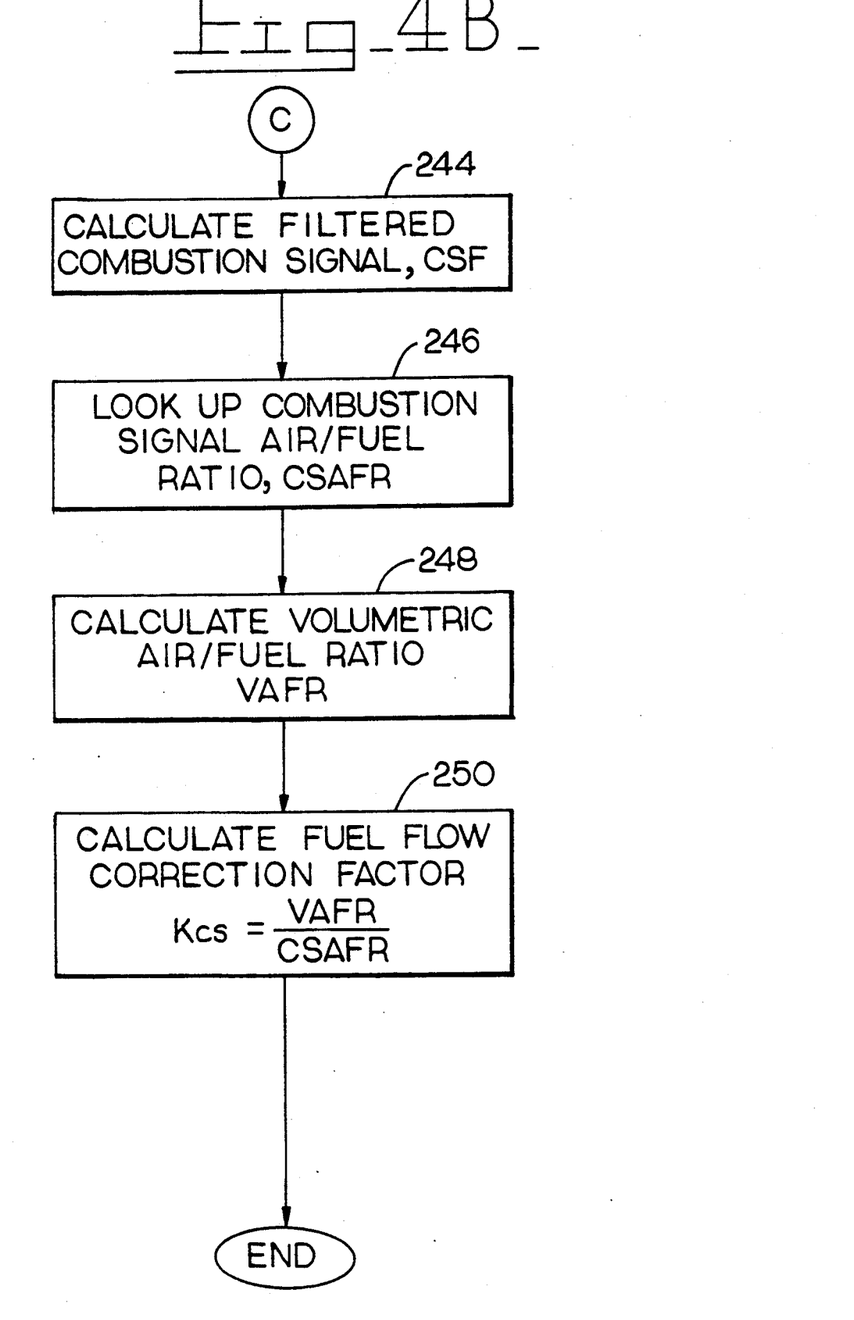

Referring now to FIGS. 4A-4B, an embodiment of software for programming the control unit 12 is discussed. Initially the control unit 12 is activated and initialized in the block 200. Thereafter, in the block 202, various engine operating parameters are read into the control unit 12 by monitoring the various sensors connected to the control 12. These parameters are stored in the RAM portion of the control unit 12 and are updated every time the program executes.

In the block 204, an uncompensated fuel flow FF is calculated using the following equation:

$$FF = K_{FC} * LHV * \sqrt{((AKPA + FKPA)/FTMP) * FKPA)}$$

where $K_{FC}$ is a fuel constant, LHV is the lower heating value of the fuel as set by the fuel quality dial 72, AKPA is the sensed air manifold pressure, FKPA is the differential fuel pressure, and FTMP is the sensed fuel temperature. The fuel constant $K_{FC}$ is engine dependent and serves as a unit conversion factor in the above equation. If the approximate range of the fuel's LHV is known, the fuel quality dial 72 can be eliminated and the LHV variable can be eliminated from the above-mentioned equation. It would then be necessary to include the fuel's average LHV in the fuel constant $K_{FC}$. The uncompensated fuel flow FF is used later in the calculation of an actual air/fuel ratio, A/F, and it is representative of the mass flow rate of fuel being delivered to the engine. The uncompensated fuel flow FF does not change in response to changes in the methane number or the fuel's LHV.

Subsequently, in the block 206, a correction factor $K_{CS}$ is multiplied times the uncompensated fuel flow to arrive at a compensated fuel flow $FF_C$. The correction factor $K_{CS}$ is responsive to changes in the fuel's LHV and methane number as explained below.

The fuel per stroke F/S being supplied to the engine's combustion chamber(s) 46 is calculated in the block 208 using the following formula:

$$F/S = FF_C/(0.5*CYL*NA)$$

where CYL is the number of engine cylinders and NA is the engine speed in revolutions per minute.

Next, in the block 210, a desired air/fuel ratio DAFR is determined using a look-up table stored in the ROM portion of the control unit 12. The look-up table is empirically developed such that certain engine parameters match those specified by the engine designer. The look-up table produces a desired air/fuel ratio DAFR for a given combination of fuel per stroke F/S and engine speed NA.

In the block 212 the air flow in mass per minute is calculated by combining gas laws and equations of flow for a positive displacement pump into the following equation:

$$AF = (TED*AKPA*NA)/ATMP$$

where TED is the trapped effective displacement and ATMP is the sensed air temperature. This equation is justified as follows:

$$FLOW = (MASS/STROKE)*(NA*0.5*CYL) \quad (1)$$

and $$MASS/STROKE = (AKPA*TEV)/(R*TEMP) \quad (2)$$

where TEV is the trapped effective volume and R is the specific gas constant. The trapped effective volume TEV is an empirically determined variable which is responsive to engine speed and indicates the volume of air actually trapped in the combustion chamber (46) during the intake stroke. This variable is necessary because part of the intake air can bypass the combustion chamber (46) due to overlapping valve events during the intake stroke. Substituting equation (2) into equation (1) and combining constants yields the equation shown in the block 212.

In the immediate invention, trapped effective displacement TED is determined by accessing a 16 point look-up table which provides a value for the trapped effective displacement TED as a function of speed. The table is empirically determined under laboratory conditions for a specific engine configuration. More specifically, at each of the 16 look-up table speeds, engine parameters are controlled until the intake manifold pressure equals the exhaust manifold pressure. Under these conditions, the air flow as measured by the laboratory instruments $AF_{LAB}$ must equal the air flow AF as calculated in the block 212. As can be seen from the equation of the block 212, the only value that can be changed at this static state is the trapped effective displacement TED. Therefore, the value for the trapped effective displacement TED at a particular engine speed is adjusted until these two values $AF_{LAB}$, AF are equal and that value of trapped effective displacement is stored in the above referenced 16 point look-up table.

Subsequently, in the block 214, the desired air pressure DAKPA is calculated using the following equation:

$$DAKPA = (FF_C*DAFR*ATMP)/(TED*NA).$$

Thereafter, in the block 216, an air pressure error $e_A$ is calculated in response to a difference between the desired and actual air pressures DAKPA, AKPA.

In the block 218 a wastegate control signal WCS is calculated using a transfer function of the PID (proportional, integral, differential) type which is consistent with known control theory. More particularly, the control signal is calculated using the following formula:

$$WCS = K_{P1}*e_A + K_{D1}*\Delta e_A + K_{I1}*\Theta e_A.$$

The first or $K_{P1}$ of the transfer function is the air pressure error itself. The second or $K_{D1}$ factor is the rate of change of the air pressure error. The third or $K_{I1}$ factor is a summed or integral factor, and it is provided so that a steady state control signal is produced after the air pressure error $e_A$ has gone to zero. The constants $K_{P1}$, $K_{D1}$, and $K_{I1}$ are empirically determined and stored in the ROM portion of the control unit 12. The other factors $e_A$, $\Delta e_A$ and $\Sigma e_A$ are updated in the RAM portion of the control unit 12 during each program execution. The wastegate control signal is converted to a PWM signal by standard electrical circuitry (not shown) and delivered to the first actuator 58 to control the position of the wastegate 56.

In the block 220, a choke position is determined by accessing a look-up table stored in the ROM portion of the control unit 12. The choke look-up table provides a setting for the choke valve 99 as a function of engine speed and air/stroke. As mentioned previously, the choke valve is used to restrict air flow to the engine under light load conditions. This is necessary because the turbocharger 52 provides too much boost under low load conditions. More particularly, choking is required to increase the richness of the air/fuel mixture during low load conditions to improve engine idle stability. In the preferred embodiment, the choke valve 99 is fully open at loads greater than forty percent and increasing choke is provided with decreasing load. The control unit delivers the choke control signal to the choke actuator 100 over the conductor 102 in response to the value found in the choke look-up table.

Thereafter, in the block 244, a filtered combustion signal CSF is calculated using the following software filter equation:

$$CSF_n = CSF_{(n-1)} + [CS_n - CSF_{(n-1)}] * K_F.$$

The first factor, $CSF_{n-1}$, is the filtered combustion signal from the previous program execution and is updated in the RAM portion of the control unit 12 after each program execution. The second factor, $CS_n$, is the unfiltered combustion signal produced by the buffer circuit 112. And, the third factor $K_F$, is a filter constant for controlling the response time of the filtering equation. The filtering equation is used to stabilize the combustion signal by filtering it over time.

In the block 246 a look-up table stored in the ROM portion of the control unit 12 is accessed to determine a combustion signal air/fuel ratio CSAFR. The look-up table is empirically determined for a given engine configuration and provides a combustion signal air/fuel ratio CSAFR for a given combination of the present-loop filtered combustion signal $CSF_n$ and the fuel per stroke F/S. The combustion signal air/fuel ratio CSAFR is an indication of the effective air/fuel ratio in the combustion chamber. More specifically, the magnitude of the combustion signal air/fuel ratio CSAFR changes in response to changes in the fuel/stroke, the filtered combustion signal, or both.

Then, in the block 248, a volumetric air fuel ratio VAFR is determined by finding the ratio of the air flow AF over the uncompensated fuel flow FF. The volumetric air fuel ratio VAFR is strictly a ratio of the volumes of air and fuel delivered to the combustion chamber, and it does not account for any variations in methane number. The volumeteric air fuel ratio is then filtered using a software filtering equation similar to the one used in the block 244 to find the filtered combustion signal $CSF_n$.

Subsequently, the correction factor $K_{CS}$ is calculated using the following formula:

$$K_{CS} = VAFR/CSAFR.$$

The correction factor $K_{CS}$ is used in the block 206, during the next program execution, to correct for any changes in the fuel's quality. If the quality of the fuel supply remains constant, this value will remain constant. However, if the quality of the fuel changes or is entered incorrectly with the dial 74, the correction factor $K_{CS}$ will change accordingly.

For example, if the LHV increases or the methane number decreases, the combustion signal air/fuel ratio CSAFR will be lower than the volumetric air fuel ratio AAFR. Thus, the value of the correction factor $K_{CF}$ will be greater than one. Therefore, the compensated fuel flow FFC, calculated in the block 206, will be larger than the uncompensated fuel flow FF signifying that that the LHV of the air/fuel mixture has increased. Consequently, the controller will reduce the actuation of the wastegate 56, thereby routing more engine exhaust through the turbocharger 52. Thus, more air is delivered to the combustion chamber(s) 46 which compensates for the increase in the fuel's quality.

Conversely, if the LHV decreases or methane number increases, the combustion signal air/fuel ratio CSAFR will be greater than the volumetric air fuel ratio VAFR. Thus, the value of the correction factor $K_{CS}$ will be less than one. Therefore, the compensated fuel flow FFC, calculated in the block 206, will be less than the uncompensated fuel flow FF, signifying that the LHV of the air/fuel mixture in the combustion chamber 46 has decreased. Consequently, the controller will increase the actuation of the wastegate 56 to decrease air flow to the engine and compensate for the decrease in the fuel's quality.

INDUSTRIAL APPLICABILITY

Suppose the engine has been operating for a period of time without any changes in the fuel quality. In this instance, the ratio of the compensated and uncompensated fuel flows FF, FFC as calculated in the blocks 204,206, respectively, will be constant. Thereafter, the quality of the fuel changes. For example, suppose the LHV decreases causing the air/fuel mixture to burn more slowly. Therefore, the time difference between the occurrence of the ignition and ionization signal will increase and the combustion signal will be longer in response to this increase.

As a result, the combustion signal air/fuel ratio determined in the block 246 will be greater, or leaner. In turn, the correction factor $K_{CS}$ will be less than one, signifying that the LHV of the fuel has decreased. When the correction factor $K_{CS}$ is subsequently applied in the block 206, the compensated fuel flow $FF_C$ being smaller than the uncompensated fuel flow FF. A reduction in the value of the compensated fuel flow FFC will cause the magnitude of the desired air pressure DAKPA, calculated in block 214, to be reduced. In turn, a smaller or negative air pressure error will result from the calculation in the block 216. Therefore, the wastegate control signal WCS will be smaller in magnitude. In response to this decrease in the wastegate control signal WCS, a signal is delivered to the first actuator 58 over the conductor 60 thereby increasing actuation of the wastegate 56. Subsequently, more exhaust air will flow through the bypass 54 thereby reducing the speed of the turbocharger and ultimately air flow to the combustion chamber(s) 46.

We claim:

1. An method for controlling the ratio of an air/fuel mixture delivered to a combustion chamber of an internal combustion engine, comprising:
producing an ignition signal;
igniting said air/fuel mixture in response to said ignition signal;
producing an ionization signal responsive to a flame in said combustion chamber;
producing a combustion signal in response to a time difference between the occurrence of said ignition and ionization signals;
producing an air flow signal responsive to the amount of air delivered to said combustion chamber;
producing a fuel flow signal responsive to the amount of fuel delivered to said combustion chamber;
calculating a combustion signal air/fuel ratio in response to said combustion signal;
calculating an volumetric air/fuel ratio in response to said air flow and fuel flow signals;
producing a control signal in response to a ratio of said volumetric and combustion signal air/fuel ratios; and,
controlling the amount of air delivered to said combustion chamber in response to said control signal.

2. An apparatus for controlling the air/fuel mixture delivered to a combustion chamber of an internal combustion engine, comprising:
signal means for producing an ignition signal;
ignition means for receiving said ignition signal and igniting said air/fuel mixture in response to said ignition signal;
sensor means for producing an ionization signal in response to a flame;
timer means for receiving said ignition and ionization signals and producing a combustion signal in response to a time difference between the reception of said signals;
air flow sensor means for sensing the amount of air delivered to said combustion chamber and generating an air flow signal;
fuel flow sensor means for sensing the amount of fuel delivered to said combustion chamber and generating a fuel flow signal;
controller means for receiving said combustion, air flow, and fuel flow signals, calculating a combustion signal air/fuel ratio in response to said combustion signal, calculating a volumetric air/fuel ratio in response to said air flow and fuel flow signals, and producing a control signal in response to a ratio of said volumetric and combustion signal air/fuel ratios; and,
actuator means for receiving said control signal and controlling the amount of air delivered to said combustion chamber in response to said control signal.

3. An apparatus for controlling the air/fuel mixture delivered to a combustion chamber of an internal combustion engine, as set forth in claim 2, wherein said ignition means is disposed essentially in the center of said combustion chamber and said sensor means for producing an ionization signal is disposed in said combustion chamber longitudinally from said ignition means.

4. An apparatus for controlling the air/fuel mixture delivered to a combustion chamber of an internal combustion engine, as set forth in claim 2, wherein said ignition means includes a spark plug.

5. An apparatus for controlling the air/fuel mixture delivered to a combustion chamber of an internal combustion engine, as set forth in claim 2, wherein said combustion chamber has side and top walls and wherein said apparatus further includes:
a piston;
a main chamber defined by said combustion chamber side and top walls and said piston; and,
wherein said ignition means includes a prechamber having a spark plug disposed therein and being rigidly connected to said combustion chamber top wall and fluidly connected to said main chamber by a plurality of orifices.

6. An apparatus for controlling the air/fuel mixture delivered to a combustion chamber of an internal combustion engine, as set forth in claim 2, wherein said sensor means for producing an ionization signal includes an ionization probe.

7. An apparatus for controlling the air/fuel mixture delivered to a combustion chamber of an, internal combustion engine, as set forth in claim 2, wherein said air flow sensor means includes:
air pressure sensor means for producing an actual air pressure signal in response to the pressure of the air delivered to said combustion chamber; and,
air flow calculator means for receiving said air pressure signal and producing said air flow signal in response to said air pressure signal.

8. An apparatus for controlling the air/fuel mixture delivered to a combustion chamber of an internal combustion engine, as set forth in claim 7, wherein said apparatus further includes:
speed sensor means for producing an engine speed signal in response to the speed of said engine;
temperature sensor means for producing an air temperature signal responsive to the temperature of the air delivered to said combustion chamber; and,
wherein said air flow calculator means receives air pressure, said engine speed and said air temperature signals and produces said air flow signal in response to said received signals.

9. An apparatus for controlling the air/fuel mixture delivered to a combustion chamber of an internal combustion engine, as set forth in claim 2, wherein said fuel flow sensor means includes:
fuel pressure sensor means for producing a fuel pressure signal responsive to the pressure of the fuel delivered to the combustion chamber;
fuel flow calculator means for receiving said fuel pressure signal and producing said fuel flow signal in response to said fuel pressure signal.

10. An apparatus for controlling the air/fuel mixture delivered to a combustion chamber of an internal combustion engine, as set forth in claim 9, wherein said apparatus further includes:
means for producing an LHV signal correlative to the LHV of the fuel delivered to the combustion chamber;
fuel temperature sensor means for producing a fuel temperature signal responsive to the temperature of the fuel delivered to said combustion chamber;
air pressure sensor means for producing an air pressure signal responsive to the pressure of the air delivered to said combustion chamber; and,
wherein said fuel flow calculator means receives said fuel pressure, air pressure, LHV and fuel temperature signals and produces said fuel flow signal in response to said received signals.

11. An apparatus for controlling the air/fuel mixture delivered to a combustion chamber of an internal combustion engine, as set forth in claim 9, wherein said apparatus further includes:
- a turbocharger adapted to receive exhaust from said combustion chamber and deliver pressurized air to said combustion chamber in response to said engine exhaust;
- an exhaust bypass connected to said turbocharger and having a wastegate adapted to control the amount of engine exhaust flowing through said turbocharger; and,
- wherein said actuator means receives said control signal and controls the position of said wastegate in response to said control signal thereby controlling the amount of air delivered to said combustion chamber.

12. An apparatus for controlling the air/fuel mixture delivered to an internal combustion engine, comprising:
- signal means for producing an ignition signal;
- a generally cylindrical combustion chamber having side and top walls;
- a piston disposed and movable within said combustion chamber;
- a main chamber defined by said combustion chamber side and top walls and said piston;
- a prechamber substantially disposed at the center of said combustion chamber top and being fluidly connected to said main chamber by a plurality of orifices;
- a spark plug disposed in said prechamber and being adapted to receive said ignition signal and ignite said air/fuel mixture in response to said ignition signal;
- sensor means disposed in said combustion chamber top wall at a longitudinal distance from said prechamber for producing an ionization signal in response to a flame within said main chamber;
- timer means for receiving said ignition and ionization signals and producing a combustion signal in response to a time difference between the reception of said signals;
- air flow sensor means for sensing the amount of air delivered to said combustion chamber and generating an air flow signal;
- fuel flow sensor means for sensing the amount of fuel delivered to said combustion chamber and generating a fuel flow signal;
- controller means for receiving said combustion, air flow, and fuel flow signals, calculating a combustion signal air/fuel ratio in response to said combustion signal, calculating a volumetric air/fuel ratio in response to said air flow and fuel flow signals, and producing a control signal in response to a ratio of said volumetric and combustion signal air/fuel ratios; and,
- actuator means for receiving said control signal and controlling the amount of air delivered to said combustion chamber in response to said control signal.

13. An apparatus for controlling the air/fuel mixture delivered to a combustion chamber of an internal combustion engine, as set forth in claim 12, wherein said air flow sensor means includes:
- air pressure sensor means for producing a air pressure signal in response to the pressure of the air delivered to said combustion chamber; and,
- air flow calculator means for receiving said air pressure signal and producing said air flow signal in response to said air pressure signal.

14. An apparatus for controlling the air/fuel mixture delivered to a combustion chamber of an internal combustion engine, as set forth in claim 12, wherein said apparatus further includes:
- speed sensor means for producing an engine speed signal responsive to the speed of said engine;
- temperature sensor means for producing an air temperature signal responsive to the temperature of the air delivered to said combustion chamber; and,
- wherein said air flow calculator means receives air pressure, said engine speed and said air temperature signals and produces said air flow signal in response to said received signals.

15. An apparatus for controlling the air/fuel mixture delivered to a combustion chamber of an internal combustion engine, as set forth in claim 12, wherein said fuel flow sensor means includes:
- fuel pressure sensor means for producing a fuel pressure signal responsive to the pressure of the fuel delivered to the combustion chamber;
- fuel flow calculator means for receiving said fuel pressure signal and producing said fuel flow signal in response to said received signal.

16. An apparatus for controlling the air/fuel mixture delivered to a combustion chamber of an internal combustion engine, as set forth in claim 15, wherein said apparatus further includes:
- means for producing a LHV signal correlative to the LHV of the fuel delivered to the combustion chamber;
- fuel temperature sensor means for producing a fuel temperature signal responsive to the temperature of the fuel delivered to said combustion chamber;
- air pressure sensor means for producing an air pressure signal responsive to the pressure of the air delivered to said combustion chamber; and,
- wherein said fuel flow calculator means receives said fuel pressure, air pressure, LHV and fuel temperature signals and produces said fuel flow signal in response to said received signals.

17. An apparatus for controlling the air/fuel mixture delivered to a combustion chamber of an internal combustion engine, as set forth in claim 12, wherein said apparatus further includes:
- a turbocharger adapted to receive exhaust from said combustion chamber and deliver pressurized air to said combustion chamber in response to said engine exhaust;
- an exhaust bypass connected to said turbocharger, and having a wastegate adapted to control the amount of engine exhaust flowing through said turbocharger; and,
- wherein said actuator means receives said control signal and controls the position of said wastegate in response to said control signal thereby controlling the amount of air delivered to said combustion chamber.

18. An apparatus for controlling the air/fuel mixture delivered to a combustion chamber of an internal combustion engine, comprising:
- signal means for producing an ignition signal;
- ignition means for receiving said ignition signal and igniting said air/fuel mixture in response to said ignition signal;

sensor means for producing an ionization signal in response to a flame;

timer means for receiving said ignition and ionization signals and producing a combustion signal in response to a time difference between the reception of said signals;

air pressure sensor means for producing an air pressure signal responsive to the pressure of the air delivered to said combustion chamber; and, air flow calculator means for receiving said air pressure signal and producing said air flow signal in response to said air pressure signal;

fuel flow sensor means for producing a fuel flow signal in response to the amount of fuel delivered to the combustion chamber;

controller means for receiving said combustion, air flow, air pressure, and fuel flow signals, calculating a combustion signal air/fuel ratio in response to said combustion signal, calculating a volumetric air/fuel ratio in response to said air and fuel flow signals, calculating a correction factor in response to the ratio of said volumetric and combustion signal air/fuel ratios, calculating a compensated fuel flow responsive to said correction factor, calculating a desired air pressure signal responsive to said compensated fuel flow, and producing a control signal in response to a difference between said desired air pressure and air pressure signals; and, an actuator means for receiving said control signal from the controller and adjusting the amount of air delivered to the combustion chamber in response to said control signal.

19. An apparatus for controlling the air/fuel mixture delivered to a combustion chamber of an internal combustion engine, as set forth in claim 18, wherein said ignition means is disposed essentially in the center of said combustion chamber and said sensor means is disposed in said combustion chamber longitudinally from said ignition means.

20. An apparatus for controlling the air/fuel mixture delivered to a combustion chamber of an internal combustion engine, as set forth in claim 18, wherein said ignition means includes a spark plug.

21. An apparatus for controlling the air/fuel mixture delivered to a combustion chamber of an internal combustion engine, as set forth in claim 18, wherein said combustion chamber has side and top walls and wherein said apparatus further includes:

a piston;

a main chamber defined by said combustion chamber side and top walls and said piston; and, wherein said ignition means includes a prechamber having a spark plug disposed therein and being rigidly connected to said combustion chamber top wall and fluidly connected to said main chamber by a plurality of orifices.

22. An apparatus for controlling the air/fuel mixture delivered to a combustion chamber of an internal combustion engine, as set forth in claim 18, wherein said sensor means includes an ionization probe.

23. An apparatus for controlling the air/fuel mixture delivered to a combustion chamber of an internal combustion engine, as set forth in claim 18, wherein said apparatus further includes:

a turbocharger adapted to receive exhaust from said combustion chamber and deliver pressurized air to said combustion chamber in response to said engine exhaust;

an exhaust bypass connected to said turbocharger and having a wastegate being adapted to control the amount of engine exhaust flowing through said turbocharger; and, wherein said actuator means receives said control signal and controls the position of said wastegate in response to said control signal thereby controlling the amount of air delivered to said combustion chamber.

* * * * *